United States Patent Office.

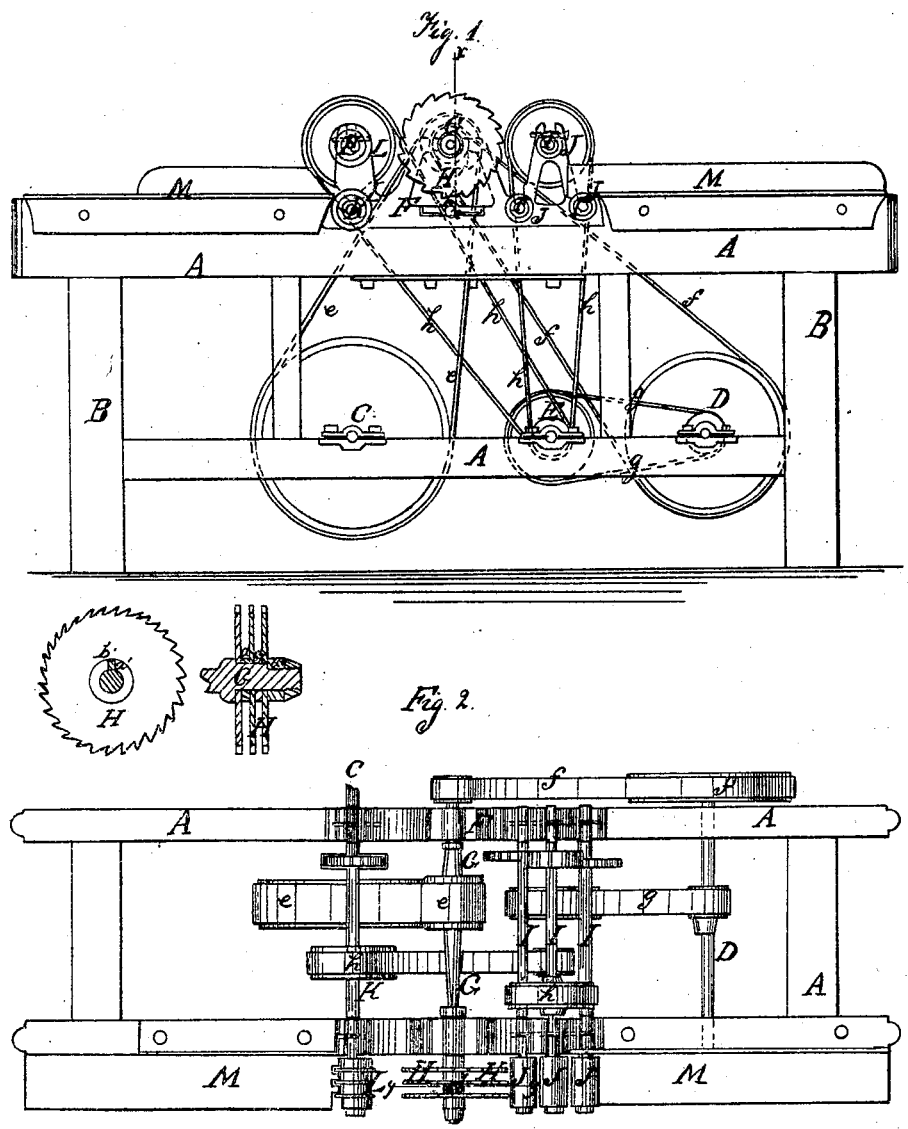

GEORGE H. SHEARER, OF BAY CITY, MICHIGAN.

Letters Patent No. 72,551, dated December 24, 1867

---

IMPROVEMENT IN SAWING-MACHINES FOR BARREL-HOOPS.

---

*The Schedule referred to in these Letters Patent and making part of the same.*

---

TO ALL WHOM IT MAY CONCERN:

Be it known that I, GEORGE H. SHEARER, of Bay City, in the county of Bay, and State of Michigan, have invented a new and improved Lath and Hoop-Sawing Machine; and I do hereby declare that the following is a full, clear, and exact description thereof, which will enable others skilled in the art to make and use the same, reference being had to the accompanying drawings, forming part of this specification, in which—

Figure 1 is a front elevation of my improved lath and hoop-sawing machine.

Figure 2 is a plan or top view of the same.

Figure 3 is a detail front view of the frame, in which are the bearings for the shafts of the saw and feed-roller.

Figure 4 is a vertical section through the saws and arbor, taken in the line $x\ x$ of fig. 1, showing the method of attaching the saws to the arbor.

Figure 5 is a side elevation of one of the saws, showing a cross-section of the arbor and key for connecting the same to the saw in the line $y\ y$, fig. 2.

Similar letters of reference indicate like parts.

This invention relates to a new manner of arranging the bearings for the axles of the feed-rollers and saw of a gang-sawing machine for cutting laths and hoops.

The invention consists in so casting a bearing for each end of all the aforesaid axles, that those of the feed-rollers can be removed whenever desired, or any one of the same, without necessitating the unscrewing of screws or nuts; (for the arbor on which the saws are mounted are provided two bearings, on each end of the machine, so that the saw may be arranged above or below the wood to be sawed;) and in the method of securing the saws to the arbor.

A represents a frame, of suitable form, shape, and material, which is supported by legs B B, and in which are bearings for the driving-shaft C, and for two shafts, D and E, all of which are parallel with each other, and arranged across the frame A, as is clearly shown in the drawing. To each side of the frame A is secured a frame, F, made of cast iron or other suitable material, in the centre of which are two journal-boxes, $a$ and $b$, one above the other, for holding the arbor G. On the end of the said arbor are mounted any number of saws, H H, the distance between which is regulated by washers $d\ d$, fig. 2, in the usual manner. On one side of the arbor G are arranged three (more or less) shafts I I, on the ends of which feed-rollers J J are mounted, which feed the wood to the saws. On the other side of the arbor are two or more shafts, K K, on which feed-rollers L are mounted for taking the sawed strips from the saw. These rollers L are either grooved and removable, or consist of large and small washers, so that the size of the grooves may be adapted to the distance between the saws on the arbor. The bearings for the shafts I and K are formed in the frame B, as shown in fig. 3, said bearings being open on top, so that the shafts can be easily removed, whenever desired. The shafts of the feed-rollers are prevented from being raised out of their bearings, by means of pins $c$, which are passed through the ears of the frame, formed on each side of the said bearings, as shown. Springs may be employed to press the feed-rollers against the wood, if desired. When the arbor is hung in the upper journal $a$, the saw is above the board to be sawed, as in fig. 1, while, when the arbor is hung in the lower journal $b$, the saw will be below the board. Motion is imparted to the arbor from the shaft C, by means of a belt, $e$, thence to the shaft D by a belt, $f$, and from the shaft D to the shaft E by a belt, $g$. The pulleys over which these belts pass are of the requisite size, so that, as by means of belts $h\ h$, motion is transmitted from the shaft E to the shafts I and K, the feed-rollers may be turned with the required degree of velocity. M M are stationary guides or supports on either side of the feed-rollers for holding the wood, before and after the same has been sawed. In securing the saws to the arbor, I braze to the latter a key, $a'$, of a square shape in its transverse section, as shown in fig. 5, and extending in the direction of its length a sufficient distance to accommodate as many saws as it may be desired to employ. This key passes through a square groove or notch, $b'$, in one side of the hole formed in the saw for the passage of the arbor. The washers $d$ between the saws are also grooved to fit over the key $a'$. By this method the saws are effectually prevented from turning upon the arbor, and are firmly secured thereto.

What I claim as new, and desire to secure by Letters Patent, is—

The metallic frame F, constructed as described, provided with the journal-boxes $a\ b$, one above the other, holding the arbor G above or below the board to be sawed, and also provided with the open bearings upon each side of the arbor G, for the removable shafts I K, all arranged as described for the purpose specified.

GEORGE H. SHEARER.

Witnesses:
    FRED. RAYNER,
    DAVID WEST.